W. E. BURKS.
MEANS FOR RAISING AND LOWERING DRILL DISKS OR PLOWS.
APPLICATION FILED JAN. 30, 1908.
911,474.
Patented Feb. 2, 1909.
2 SHEETS—SHEET 2.
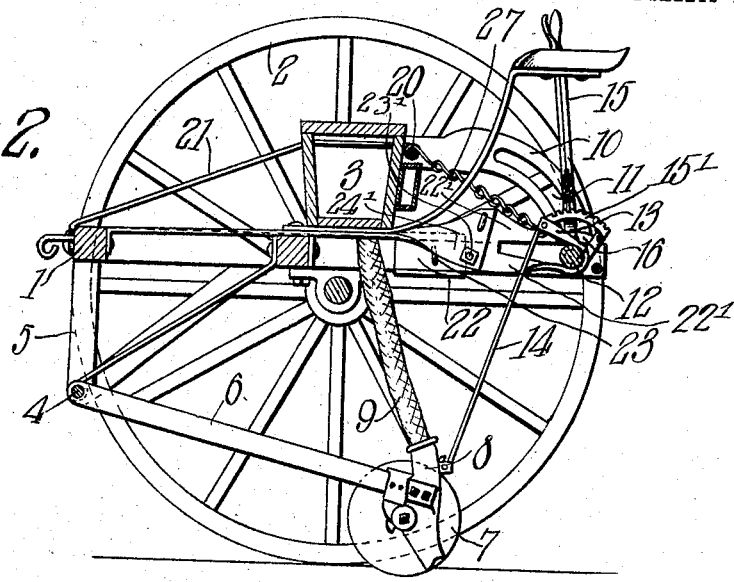
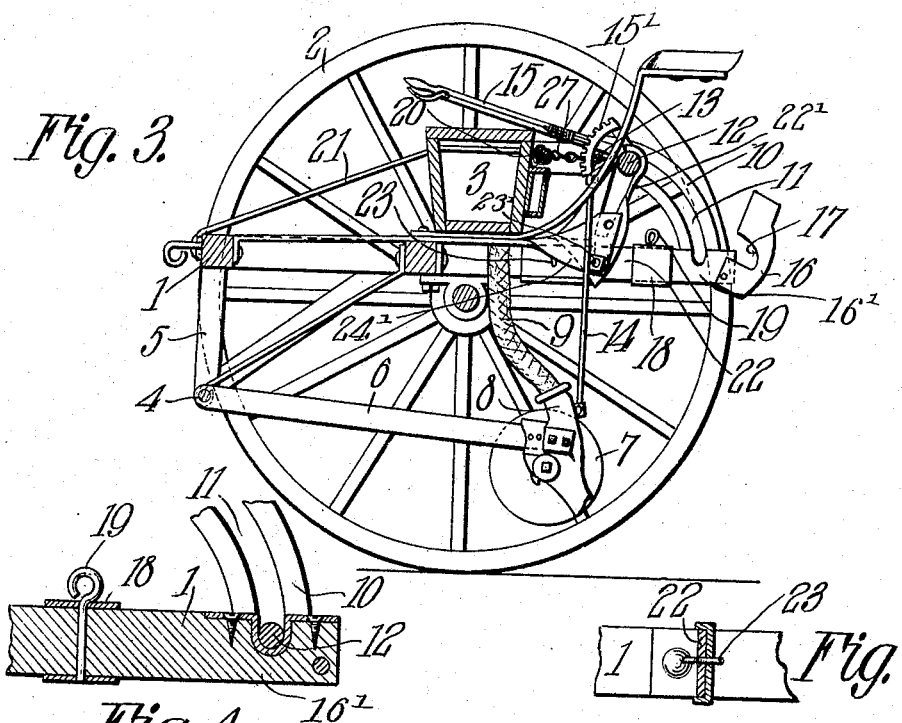
Witnesses
Inventor
William E. Burks.
By C.A. Snow & Co
Attorneys

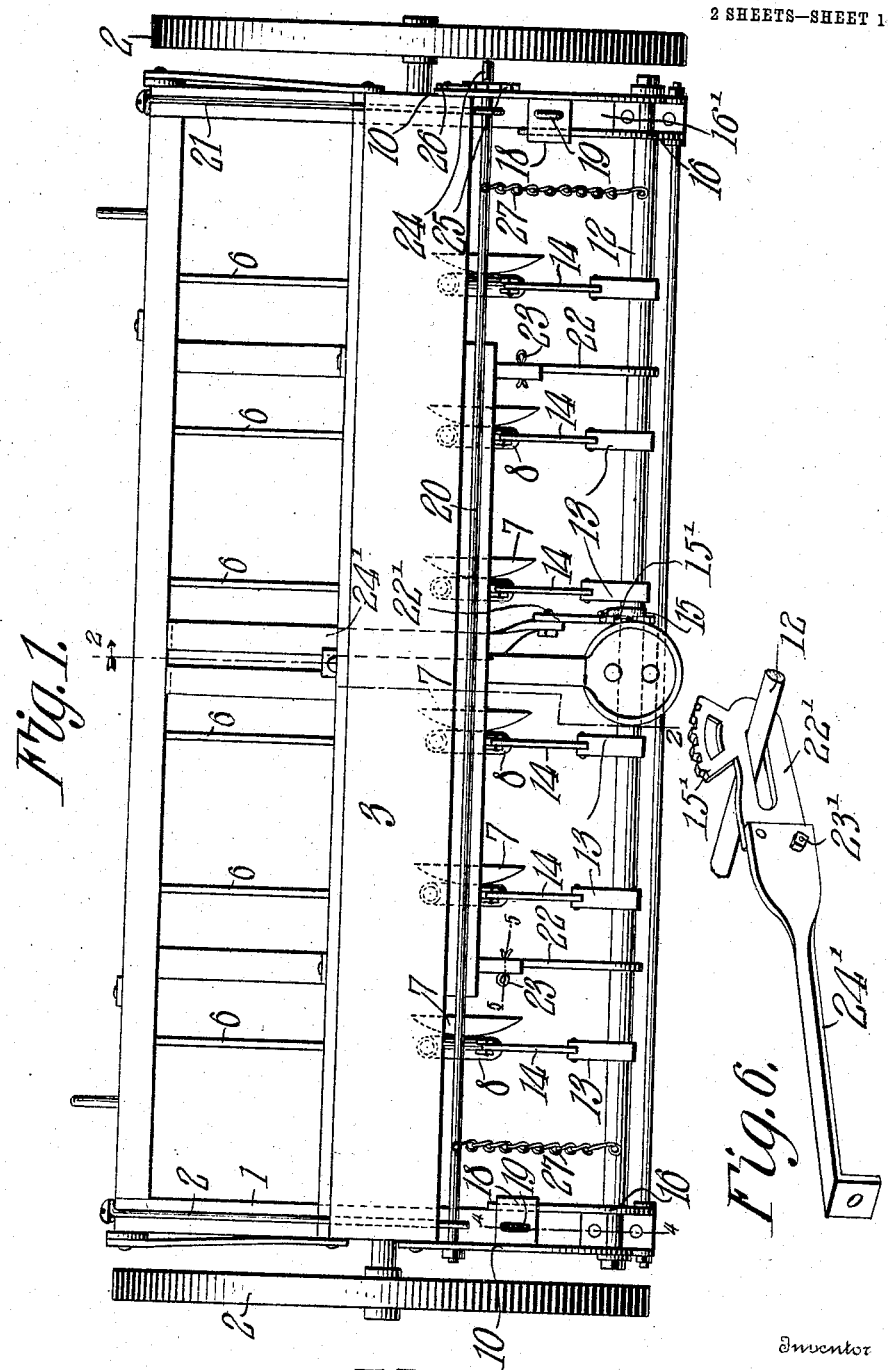

UNITED STATES PATENT OFFICE.

WILLIAM EDWARD BURKS, OF KERRVILLE, TEXAS, ASSIGNOR OF ONE-THIRD TO BURCH MILLER HIXSON AND ONE-THIRD TO LEE WALLACE, BOTH OF KERRVILLE, TEXAS.

MEANS FOR RAISING AND LOWERING DRILL DISKS OR PLOWS.

No. 911,474.

Specification of Letters Patent.

Patented Feb. 2, 1909.

Application filed January 30, 1908. Serial No. 413,464.

*To all whom it may concern:*

Be it known that I, WILLIAM EDWARD BURKS, a citizen of the United States, residing at Kerrville, in the county of Kerr and State of Texas, have invented a new and useful Means for Raising and Lowering Drill Disks or Plows, of which the following is a specification.

This invention has relation to means for raising and lowering drill disks or plows and it consists in the novel construction and arrangement of its parts as hereinafter shown and described.

The object of the invention is to provide a means for elevating disk drills sufficiently to enable the drill to be readily transported from place to place and over low underbrush, stumps and rocks without danger of the disks being damaged by engaging such obstructions. Means is also provided for raising and lowering the disks while they are in contact with the soil.

In the accompanying drawing: Figure 1 is a top plan view of a drill provided with the raising and lowering means. Fig. 2 is a transverse sectional view of the drill cut on the line 2—2 of Fig. 1 showing the disks in lowered position. Fig. 3 is a transverse sectional view of the drill cut on the line 2—2 of Fig. 1 and showing the disks in elevated position. Fig. 4 is a sectional view of an end portion of the drill cut on the line 4—4 of Fig. 1. Fig. 5 is a transverse sectional view of a brace used on the drill and cut on the line 5—5 of Fig. 1. Fig. 6 is a perspective view of an arm used in the mechanism.

The drill consists of the frame 1 which is supported by the ground wheels 2. The seed box 3 is mounted upon the frame 1. The bar 4 is supported under the forward portion of the frame 1 by the depending brackets 5. The forward ends of the beams 6 are pivoted upon the bar 4. The disks 7 are journaled upon the rear end portions of the beams 6 and the boots 8 are located adjacent the said disks. Plow points (not shown) may be substituted for the disks 7 if desired. The flexible tubes 9 lead from the seed box 3 to the boots 8 in the usual manner. The segmental guides 10 are located at the rear portions of the sides of the frame 1 and are provided with the curved elongated slots 11. The bar 12 is located at its ends in the slots 11. Said bar is provided at intervals with the lugs 13 which are connected by means of the links 14 with the boots 8. A lever 15 is fixedly mounted upon the bar 12 and is adapted to turn the same axially whereby the lugs 13 will be swung and the links 14 will be moved longitudinally which will cause the disks 7 to operate deep or shallow in the ground as desired.

The latch plates 16 are pivotally attached to the side pieces 16' of the frame 1 and are provided with notches 17 which are adapted to receive the end portions of the bar 12. The sleeves 18 are slidably mounted upon the end pieces of the frame 1 and are adapted to be slipped over the free ends of the latch plates 16 and when so positioned are secured in place by the pins 19 which are passed vertically through the said sleeves and the pieces 16' of the frame 1. The shaft 20 is journaled for rotation between the upper end portions of the guides 10 and the brace rods 21 are attached at their forward ends to the forward portion of the frame 1 and pass transversely through the seed box 3 and are provided at their rear ends with bearings which receive the shaft 20. The braces 32 are made up of front and rear sections which are normally held together by pins or bolts 23. The rear sections of the braces 22 are provided with perforations which receive the bar 12 and the forward sections of the said braces are fixed to the frame 1.

A gear segment 15' is mounted upon the rear portion of the arm 22' which is located near the middle of the drill. The said arm 22' is pivotally attached by means of the bolt 23' to the arm 24' which is fixed to the frame 1. The shaft 12 passes through the arm 22' and the lever 15 is mounted upon the shaft 12 adjacent the segment 15' and is provided with a pawl mechanism adapted to engage the said segment whereby the lever is held in fixed position with relation to the arm 22'.

The shaft 20 is provided with a squared end 24 which is adapted to enter a similar socket provided in a crank handle (not shown). The ratchet wheel 25 is fixed to the shaft 20 and the pawl 26 is pivotally mounted upon one of the guides 10 and is adapted to engage the said ratchet wheel 25. The forward ends of the chains 27 are fixed to the shaft 20 and the rear ends of said chains are fixed to the bar 12.

When it is desired to elevate the disk 7 above the surface of the ground the pins 19 are removed and the sleeves 18 are slipped longitudinally along the end pieces of the frame 1. The latch plates 16 are then swung back upon their pivots. The pins 23 are removed from the braces 22 and the shaft 20 is rotated by means of a crank handle which is applied to the squared end 24 thereof. As the said shaft 20 rotates the chains 27 wind thereon and the bar 12 is drawn toward the shaft 20. As the said bar moves along the slots 11 the rear ends of the beams 6 are elevated through the connecting links 14. To lower the rear ends of the beams 6 the operation above described is reversed. It will be observed that during the process of raising and lowering the bar 12 and its connections the greater portion of the stress is borne by the brace rods 21 which are fixed at their forward ends to the frame 1 and which are provided with eyes or bearings which receive the shaft 20.

When it is desired to adjust the boots 8 vertically, without moving the bar 12 bodily along the guides 11, the operator swings the lever 15, which turns the said bar 12, and the lugs 13 are moved in vertical planes, which, in turn, move the links 14 longitudinally, and thus the said boots 8 are adjusted.

Having thus described my invention, what I claim as new and desire to secure by Letters Patent is:

1. An implement as described comprising a frame, pivoted beams supported thereby and carrying earth engaging elements, guides mounted upon the frame, a bar engaging said guides, links connecting the bar with the beams, a shaft journaled for rotation between the guides, brace rods having eyes which receive said shaft and which are attached at their ends to the frame and flexible elements connecting the shaft with the bar.

2. An implement as described comprising a frame, a seed box mounted thereon, beams pivotally supported by the frame and having earth engaging elements, guides mounted upon the frame and connected with the seed box, a bar engaging said guides, links connecting the bar with the beams, a shaft journaled for rotation between the guides, brace rods attached at their forward ends to the frame and passing transversely through the seed box and receiving said shaft and flexible elements connecting the shaft with the bar.

3. An implement as described comprising a frame, beams pivotally supported thereby and carrying earth engaging elements, guides mounted upon the frame, a bar engaging the guides, links connecting the bar with the beams means for moving the bar along the guides, latch plates pivotally attached to the frame and having notches for the reception of said bar, and sleeves slidably mounted upon the frame and adapted to receive the free ends of said latch plates.

In testimony that I claim the foregoing as my own, I have hereto affixed my signature in the presence of two witnesses.

WILLIAM EDWARD BURKS.

Witnesses:
J. L. VINING,
J. E. GRINSTEAD.